Patented Sept. 19, 1922.

1,429,463

UNITED STATES PATENT OFFICE.

ALBERT R. SQUYER, OF PEORIA, ILLINOIS, ASSIGNOR TO THE HOLT MANUFACTURING COMPANY, OF STOCKTON, CALIFORNIA, A CORPORATION OF CALIFORNIA.

CALCULATOR FOR TRACTOR PERFORMANCE.

Application filed May 24, 1920. Serial No. 383,738.

*To all whom it may concern:*

Be it known that I, ALBERT R. SQUYER, a citizen of the United States, residing at Peoria, in the county of Peoria and State of Illinois, have invented new and useful Improvements in Calculators for Tractor Performance, of which the following is a specification.

This invention relates to calculators for tractor performance. It has for its object to enable one to easily and quickly arrive at the draw-bar pull or tons gross load of a tractor operating under various given road conditions and percentages of grades.

The device in its present form consists of two cards rotatable relatively to each other, one of said cards bearing plotted designations pertaining to the percentage of grade and the other card bearing designations pertaining to different characters of roads, the two designations or scales being arranged in position to co-operate with each other and one of said cards being also a scale pertaining to the hauling capacity of the tractor and the corresponding portion of the other card bearing indications pertaining to gear ratios of the tractor, said designations and scales being so co-related that when the indications for a given road condition register with the indications for a known grade, then the indicator for a given gear ratio will register with a graduation on the scale which correctly represents the capacity of the tractor under the conditions given.

One form which my invention may assume is exemplified in the following description and illustrated in the accompanying drawings, in which.

Figure 1:
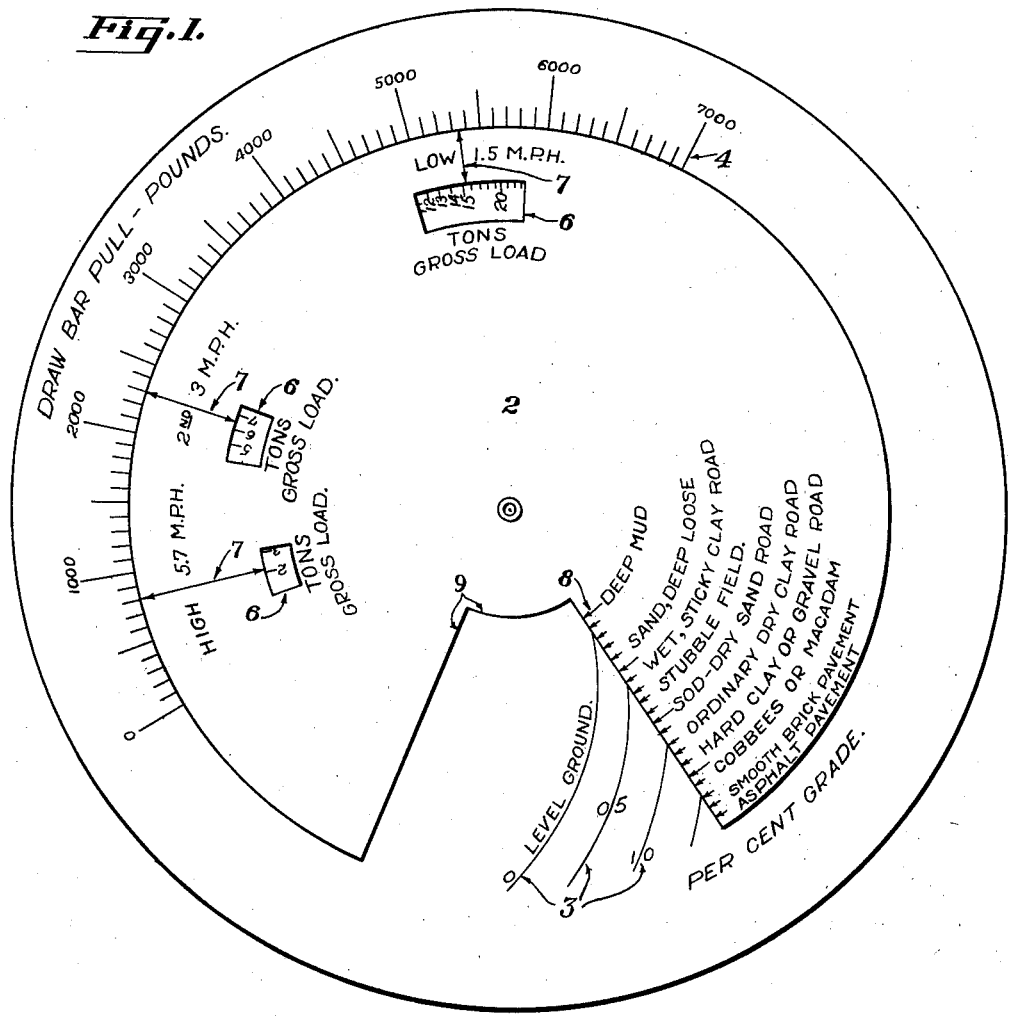
Fig. 1 shows a plan view of a device embodying my invention.
Figure 2:
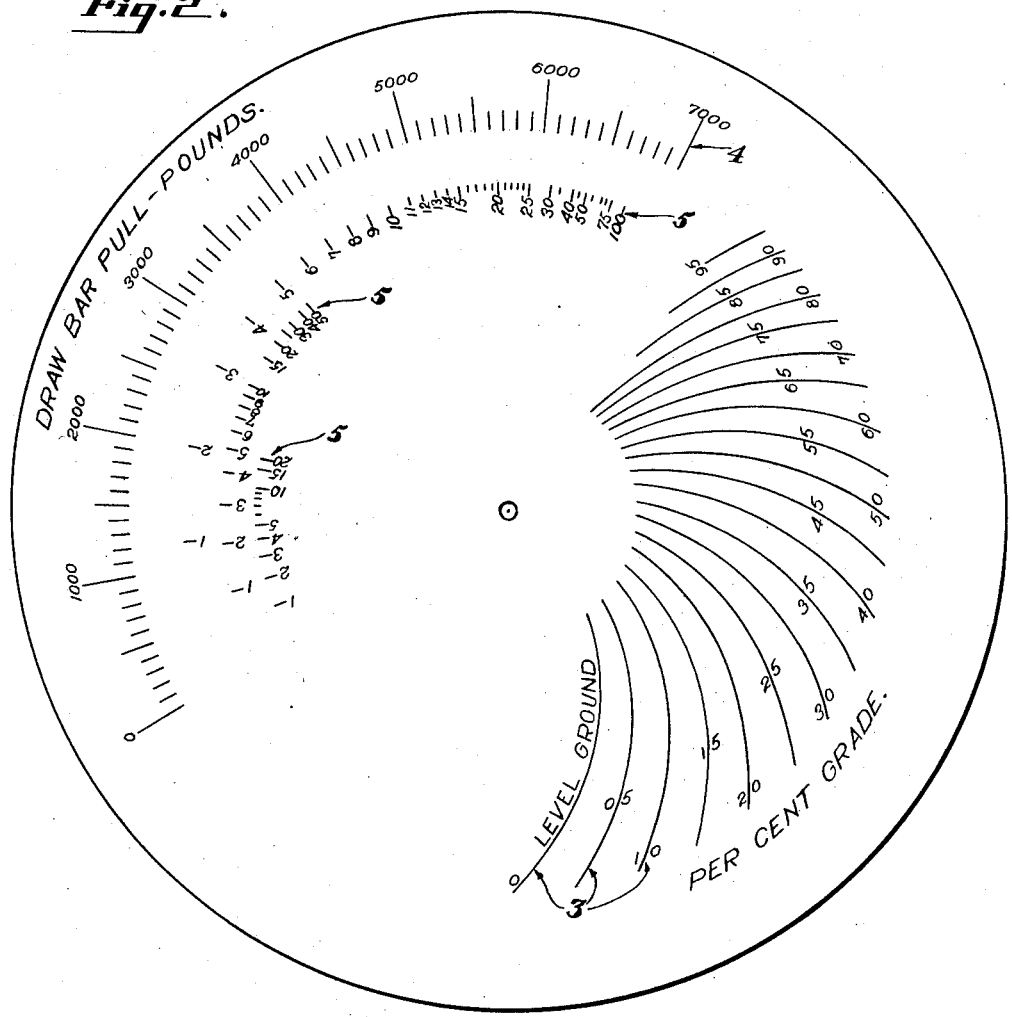
Fig. 2 shows a plan view of the lower member or base card employed therein.

Referring in detail to the accompanying drawing, the numeral 1 designates a base card upon which is mounted a rotatable disk 2. The disk may be fastened to the base card by an eyelet or other suitable means. On the base card are arranged a series of curved lines 3 which are properly labeled and designated as percentages of grades. These lines are covered by the disk 2 except when the latter is rotated to a position where a segmental opening exposes the lines. A scale 4 is arranged on the base card in position to fall just outside and concentric with the circle of the disk. This scale is labeled and designated as "Draw-bar pull pounds." A series of scales 5 are also located on the base card and pertain to tons gross load. A number of small openings 6, one for each of the scales 5, are provided on the disk 2 and so positioned as to register with said scales.

On one edge of the segmental opening in the disk 2 is arranged a scale 8. This scale is labeled with various types of road or ground surface such as may be encountered in tractor operation. On the outer edge of the disk 2 are drawn a number of arrows or pointers 7. These are properly labeled with abbreviations representing speed in miles per hour and the gear ratio in which the tractor may be driven. The operation of the device is as follows:

The disk 2 is rotated about its center on the base card 1 until an arrow on the scale 8, which represents a certain type of road surface, is coincident with a line 3 on the base card 1 which represents a certain chosen per cent grade up which the tractor is to operate. Pounds draw bar pull are read on the scale 4 as indicated by the pointers 7 at the chosen speeds or gear ratios. The tons, gross load hauling capacity are read on the scales 5 through the openings 6 in the disk 2.

This calculator may be made with the disk 2 constructed of transparent material. With this construction, the various openings need not be used, as all characters appearing on the base card 1 and covered by disk 2 may be read directly through the disk. This latter form also permits of the lines 3 being placed on the disk 2 and the scale 8 being placed on the base card 1.

The principles underlying the construction of this calculator will be apparent to those skilled in the art. The lines 3 on the base card 1 are laid off proportionally to the sine of the angle of grade. Percent grade is equivalent to the tangent of the angle, but the force P, required to move a given load W up a grade of a certain angle $\varphi$ is equal to the weight W, times the sine of the angle $\varphi$ or P=W sine $\varphi$. Therefore, the lines 3 are spaced angularly about the center of rotation of the disk 2 on the sine scale, but are labeled as the tangent of the angle and designated as percent grade. The lines 3 are plotted in a curved form in corelation with the scale 8 on the disk 2. It will be noted that when the outer end of the scale 8 is placed to coincide with the 20% grade line, that every fifth mark on the scale 8 coincides with a line 3 which is a multiple of 5 or mark 20 coincides with 0 grade. The scale 8 is then labeled with the type of ground or road surface which corresponds to the percent rolling friction for that particular surface.

Thus the rolling friction on a smooth brick pavement is 2 percent. Therefore the second mark from the outer edge of the disk 2 on the scale 8 is labeled "Smooth brick pavement." This process is carried out for all types of road surfaces and grades. The scale 4 on the base card 1 is established through calculations involving the weight of the tractor and the percent grade, which will be apparent to those skilled in the art. The scales 5 are established through calculations involving draw bar pull, weight of load and percent grade which will also be readily apparent.

The pointers 7 are established through calculations involving draw bar horse power, speed and drawbar pull.

The calculator described in the foregoing is of simple and economical construction and may be used to advantage by manufacturers of tractors as an advertising medium.

Various changes in the construction and arrangement of the several parts may be employed without departing from the spirit of my invention as disclosed in the appended claims.

Having thus described my invention, what I claim and desire to secure by Letters Patent is:

1. A calculator for tractor performance, comprising two cards rotatable relatively to each other, one of said cards bearing plotted designations pertaining to percentage of grade, and the other card bearing designations pertaining to the character of road to be negotiated, the two designations being in position to co-operate with each other, and one of said cards bearing also a scale pertaining to the hauling capacity of the tractor and a corresponding portion of the other card bearing indications pertaining to the gear ratio of the tractor, said designations and scales being so co-related that when the indicator for a given road condition registers with the indicator for a known grade, then the indicator for a given gear ratio will register with a graduation on the scale which correctly represents the capacity of the tractor under the conditions given.

2. A calculator for tractor performance comprising two cards rotatable relatively to each other, one of said cards bearing a series of curved lines laid off proportionally to the sine of the angle of the grade and spaced angularly about the center of rotation of the cards to indicate various grade percentages, the other card having a co-acting scale extending radially thereof and graduated to show the rolling friction offered by various conditions of roads, and one of said cards bearing a scale pertaining to the hauling capacity of the tractor with the corresponding portion of the other card bearing indicators to represent different gear ratios of the tractor, whereby when the indicator for a given road condition registers with the indicator for a known grade, then the indicator for a given gear ratio will register with a graduation on the scale which will correctly represent the capacity of the tractor under the conditions given.

In testimony whereof I have hereunto set my hand in the presence of two subscribing witnesses.

ALBERT R. SQUYER.

Witnesses:
 M. M. BICKERMAN,
 CHARLES FIELD BALL.